United States Patent
Ryu et al.

(10) Patent No.: US 9,507,424 B2
(45) Date of Patent: Nov. 29, 2016

(54) USER LOCATION-BASED DISPLAY METHOD AND APPARATUS

(75) Inventors: Hee-seob Ryu, Seongnam-si (KR); Seung-kwon Park, Yongin-si (KR); Jong-hyuk Jang, Gunpo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 738 days.

(21) Appl. No.: 12/783,835

(22) Filed: May 20, 2010

(65) Prior Publication Data

US 2011/0131502 A1 Jun. 2, 2011

(30) Foreign Application Priority Data

Dec. 1, 2009 (KR) .................. 10-2009-0117758

(51) Int. Cl.
*G06F 3/00* (2006.01)
*G06F 3/01* (2006.01)
*G06F 3/0481* (2013.01)

(52) U.S. Cl.
CPC ........... *G06F 3/017* (2013.01); *G06F 3/04815* (2013.01)

(58) Field of Classification Search
CPC .......................... G06F 3/017; G06F 3/04815
USPC .................................. 345/156; 715/863, 744
See application file for complete search history.

(56) References Cited

U.S. PATENT DOCUMENTS 7,134,080 B2 * 11/2006 Kjeldsen et al. ............. 715/730
7,225,414 B1 * 5/2007 Sharma et al. ............... 715/863
2006/0119572 A1 * 6/2006 Lanier ........................... 345/156
2008/0018595 A1 1/2008 Hildreth et al.
2008/0129688 A1 6/2008 Richardson et al.
2009/0058829 A1 3/2009 Kim et al.

OTHER PUBLICATIONS

Extended European Search Report dated May 11, 2011, in application No. 10190697.2.
Krahnstoever, N. et al., "A Real-Time Framework for Natural Multimodal Interaction with Large Screen Displays", Proceedings of the Fourth IEEE International Conference on Multimodal Interfaces, Oct. 14-16, 2002, p. 349-354.
Communication issued on Oct. 26, 2015 by the Korean Intellectual Property Office in related Application No. 10-2009-0117758.

* cited by examiner

*Primary Examiner* — Andrey Belousov
(74) *Attorney, Agent, or Firm* — Sughrue Mion, PLLC (57) ABSTRACT

A user location-based display method and apparatus are provided. The display method includes the steps of determining a location of a user relative to a display apparatus, configuring and displaying a screen based on the location of the user, selectively extracting user information based on the location of the user, and changing the displayed screen based on the extracted user information. As a result, a realistic interaction is possible between the display apparatus and the user, and the user is provided with contents in a very effective manner. The user location-based display apparatus includes a location recognizing unit which determines a location of a user relative to the display apparatus. A control unit causes a screen to be configured and displayed based on the location of the user; causes user information to be selectively extracted based on the location of the user, and is configured to cause a displayed screen to be changed based on the extracted user information.

16 Claims, 10 Drawing Sheets

USER LOCATION-BASED DISPLAY METHOD AND APPARATUS

CROSS-REFERENCE TO RELATED APPLICATIONS

This application claims priority from Korean Patent Application No. 10-2009-0117758, filed on Dec. 1, 2009, in the Korean Intellectual Property Office, the disclosure of which is incorporated herein by reference in its entirety.

BACKGROUND

1. Field

Methods and apparatuses consistent with the exemplary embodiments relate to a user location-based display method and apparatus. More particularly, the exemplary embodiments relate to a display method and apparatus which configure a screen according to a location of a user, and apply variable methods of user input, depending on the location of the user.

2. Description of the Related Art

The development of large size television (TV) technology, which was mainly led by the two technologies, i.e., thin film transistor liquid crystal displays (TFT LCD) and the plasma display panels (PDP), continues to provide viewers with images on larger screens.

The large screens are used in many applications. For example, in the advertisement field, the large screens are adapted to provide a variety of contents and dynamic video services in more ways that appeal to customers, compared to conventional advertisements which only provide flat and fragmented contents. A display apparatus designed for the above-mentioned purpose is a so-called digital information display (DID), and a large screen display formed in the abovementioned manner is a so-called large format display (LFD).

However, the application of large size display apparatuses in areas such as advertising, has room for improvement. That is, content can be configured and displayed in a more unique manner, and much more considerations about the environments of the user near the large screen displays can be taken into account.

Therefore, there is a need for methods that raise the user's interest or curiosity more actively, and provide contents which are more effectively based on interaction with the user.

SUMMARY

Exemplary embodiments overcome the above disadvantages as well as other disadvantages not described above. Also, the exemplary embodiments are not required to overcome the disadvantages described above. An exemplary embodiment of the present invention may not overcome any of the problems described above.

The exemplary embodiments provide a display method and apparatus which configure a screen according to a location of user, and apply user input in different ways, depending also on the location of the user, thereby providing realistic interaction with the user.

According to an aspect of the present invention, there is provided a display method of a display apparatus, which may include the steps of determining a location of a user relative to the display apparatus, configuring and displaying a screen based on the location of the user, selectively extracting user information based on the location of the user, and changing the displayed screen based on the extracted user information.

The location of the user may be a distance from the display apparatus to the user, and the configuring and displaying may include configuring the screen with a content which operates in response to the touch of the user, and displays the configured screen when the distance to the user is shorter than a first distance.

The location of the user may be a distance from the display apparatus to the user, and the selectively extracting may include selectively extracting the user information based on coordinate information of a location where the user touches on the display apparatus, when the distance to the user is shorter than a first distance.

The configuring and displaying may include configuring a menu screen to select an item and displaying the configured menu screen. The changing may include changing to a screen which is related to an item which corresponds to the coordinate information of the location where the user touches the display apparatus.

The location of the user may be a distance from the display apparatus to the user, and the selectively extracting may include selectively extracting the user information based on information related with a user motion, when the distance to the user is equal to or longer than a first distance and shorter than a second distance.

The user motion may include at least one of a face motion and a hand motion of the user.

The changing may include changing the screen to distinguish a certain portion of the screen from the rest area, when a face or hand of the user is directed to the certain portion of the screen.

The location of the user may include a direction where the user is positioned relative to the screen of the display apparatus, and the configuring and displaying may include configuring the screen so as to give the effect that the screen is displayed to the direction where the user is positioned, and displaying the configured screen.

The location of the user may include a distance from the display apparatus to the user, and the selectively extracting may include selectively extracting the user information based on information related with a direction to which the user moves, when the distance to the user is equal to or longer than a second distance and shorter than a third distance.

The changing may include changing the screen so as to give an effect that the screen is displayed to a certain direction, when the user moves to the certain direction.

The location of the user may include a distance from the display apparatus to the user, and the configuring and displaying may include configuring an advertising screen and displaying the advertising screen, when the distance to the user is equal to or longer than a first distance and shorter than a third distance.

According to another aspect of the present invention, there is provided a display method of a display apparatus, which may include dividing an ambient area of the display apparatus into a plurality of areas, setting a method of giving a command with respect to the display apparatus for each of the plurality of areas, determining an area the user is positioned among the plurality of areas, and ignoring command, when command input is non-compliant with the command giving method which is set with respect to the area where the user is positioned, and displaying the screen in accordance with the command, when command input is compliant with the set method.

According to yet another aspect of the exemplary embodiments, there is provided a display apparatus, which may include a location recognizing unit which determines a location of a user relative to the display apparatus, and a control unit which causes a screen to be configured and displayed based on the location of the user, causes user information to be selectively extracted based on the location of the user, and causes the displayed screen to be changed based on the extracted user information.

The location of the user may be a distance from the display apparatus to the user, and the control unit may cause the screen to be configured to provide a content which operates in response to the touch of the user, and displayed, when the distance to the user is shorter than a first distance.

The location of the user may be a distance from the display apparatus to the user, and the control unit may cause the user information to be selectively extracted based on coordinate information of a location where the user touches the display apparatus, when the distance to the user is shorter than a first distance.

The control unit may cause a menu screen to select an item to be configured and displayed, and may cause a current screen to be changed to a related screen with an item which corresponds to the coordinate information of the location where the user touches the display apparatus.

The location of the user may be a distance from the display apparatus to the user, and the control unit may cause the user information to be selectively extracted based on information related with a user motion, when the distance to the user is equal to or longer than a first distance and shorter than a second distance.

The user motion may include at least one of a face motion and a hand motion of the user.

The control unit may cause the screen to be changed to distinguish a certain portion of the screen from the rest area, when a face or hand of the user is directed to the certain portion of the screen.

The location of the user may include a direction where the user is positioned relative to the screen of the display apparatus, and the control unit may cause the screen to be configured so as to give the effect that the screen is displayed in the direction where the user is positioned.

The location of the user may be a distance from the display apparatus to the user, and the control unit may cause the user information to be selectively extracted based on information related with a direction to which the user moves, when the distance to the user is equal to or longer than a second distance and shorter than a third distance.

The control unit may cause the screen to be changed so as to give the effect that the screen is displayed to a certain direction, when the user moves in the certain direction.

The location of the user may be a distance from the display apparatus to the user. The control unit may cause an advertising screen to be configured and displayed, when the distance to the user is equal to or longer than a first distance and shorter than a third distance.

According to yet another aspect of the exemplary embodiments, there is provided a display apparatus, which may include a location recognizing unit which determines an area where a user is positioned, and a control unit which divides an ambient area of the display apparatus into a plurality of areas, sets a method of giving a command with respect to the display apparatus for each of the plurality of areas, and ignores a command, when the command input is non-compliant with the command giving method, which is set with respect to the area where the user is positioned, and displays the screen in accordance with the command, when command input is compliant with the set method.

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION OF EXEMPLARY EMBODIMENTS

Certain exemplary embodiments will now be described in greater detail with reference to the accompanying drawings.

In the following description, the same drawing reference numerals are used to represent the same elements, in different drawings. The matters defined in the description, such as detailed construction and elements, are provided to assist in a comprehensive understanding of the exemplary embodiments. Thus, it is apparent that the exemplary embodiments can be carried out without those specifically defined matters defined in the description. Also, well-known functions or constructions are not described in detail since they would obscure the exemplary embodiments with unnecessary detail.

In the following description, the basic structure of the display apparatus and principles of operation thereof will be explained first with reference to FIGS. 1 and 4, which will be followed by an explanation of the user motions in each location, with reference to FIGS. 5 to 8, followed by an explanation of the flow of motions for configuring the screen, with reference to FIG. 9.

Basic Structure of a Display Apparatus and Principles of Operation Thereof

Figure 1:
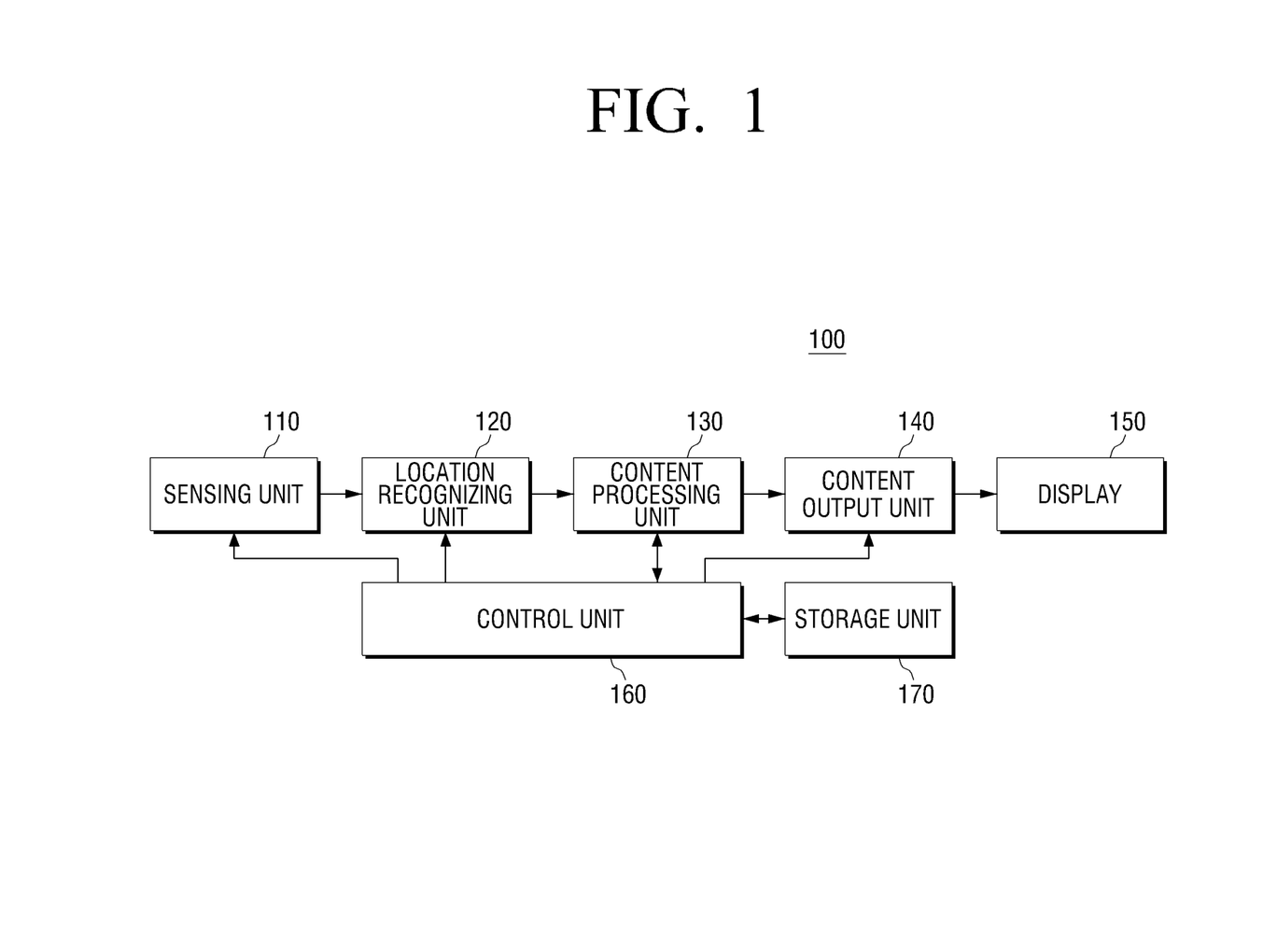
FIG. 1 is a view illustrating a display apparatus according to an exemplary embodiment.

FIG. 1 illustrates a display apparatus 100 according to an exemplary embodiment.

Display apparatus 100 according to an exemplary embodiment configures a screen according to a location of a user relative to display apparatus 100, provides the configured screen to the user, and responds only to the manipulations which are made with respect to display apparatus 100, and which correspond to the location of the user.

Display apparatus 100 may include a sensing unit 110, a location recognizing unit 120, a content processing unit 130, a content output unit 140, a display 150, a control unit 160, and a storage unit 170.

Sensing unit 110 senses a user input such as touch made with respect to a front image or to a screen of display apparatus 100. Sensing unit 110 transmits information regarding a sensed image or touch to location recognizing unit 120.

Location recognizing unit 120 receives the information about the sensed image or touch from sensing unit 110, and extracts information about a user ('user information') based on the sensed image or touch.

The 'user information' includes information related to user, including, but not limited to, a location of the user relative to display apparatus 100, coordinates of a location on display apparatus 100 where the user touches, a user motion made in front of display apparatus 100, or a direction of user movement in front of display apparatus 100.

Specifically, location recognizing unit 120 extracts from the sensed image the user information, based on the user location or area relative to the display apparatus 100, and selectively extracts part of or the entire user information based on user location or area.

By way of example, location recognizing unit 120 may extract from the sensed image the user information indicating that the user is in a first area, and exclusively extract the information about the direction of user movement which corresponds to the first area.

As explained above, user information is selectively extracted based on the user location or area, considering the fact that, depending on the purpose of display apparatus 100, some user information may be necessary while the rest of the user information may not be necessary.

By way of example, if display apparatus 100 displays an advertisement of a product, the user information such as a user's touch is unnecessary for display apparatus 100.

However, according to an aspect of the exemplary embodiments, since display apparatus 100 may operate for variable purposes depending on the user location or area, it is necessary for the display apparatus to receive general information about the user and selectively extract the user information considered necessary, based on the user location or area.

The location recognizing unit 120 transmits the information about the user location or area and the selectively-extracted user information to content processing unit 130. First, location recognizing unit 120 transmits to the information about the user location or area which is sensed by sensing unit 110 content processing unit 130, and then transmits the user information which is selectively extracted in accordance with the user location or area to content processing unit 130.

Content processing unit 130 processes the content based on the information about the user location or area, which is received from location recognizing unit 120, to configure a screen. By way of example, content processing unit 130 may configure a screen for product purchase, when determining that the user is near display apparatus 100, or may configure a screen for product advertisement, when determining that the user is away from display apparatus 100.

Content processing unit 130 transmits the configured screen to content output unit 140, and content output unit 140 causes a screen corresponding to the image signal received from the content processing unit 130 to be output, and thus provided to the user through display 150.

Control unit 160 controls the overall operation of display apparatus 100. Specifically, control unit 160 controls sensing unit 110 to sense, for example, a user touch input with respect to the front image or the screen of display apparatus 100, and to transmit information about the sensed image or touch to location recognizing unit 120.

Additionally, control unit 160 controls location recognizing unit 120 to extract the user information based on the user location or area relative to display apparatus 100, and to selectively extract part of or the entire user information based on the user location or area.

Additionally, control unit 160 controls content processing unit 130 and content output unit 140 to configure and output a screen corresponding to the user location, or to change a screen based on the selectively extracted user information, and outputting the user information to the screen.

Storage unit 170 is a recording medium which stores programs for operating the entirety of display apparatus 100, and may include, but is not limited thereto, a memory, or a hard disk drive (HDD).

The detailed operation of display apparatus 100 according to an exemplary embodiment will be explained below with reference to FIG. 2.

Figure 2:
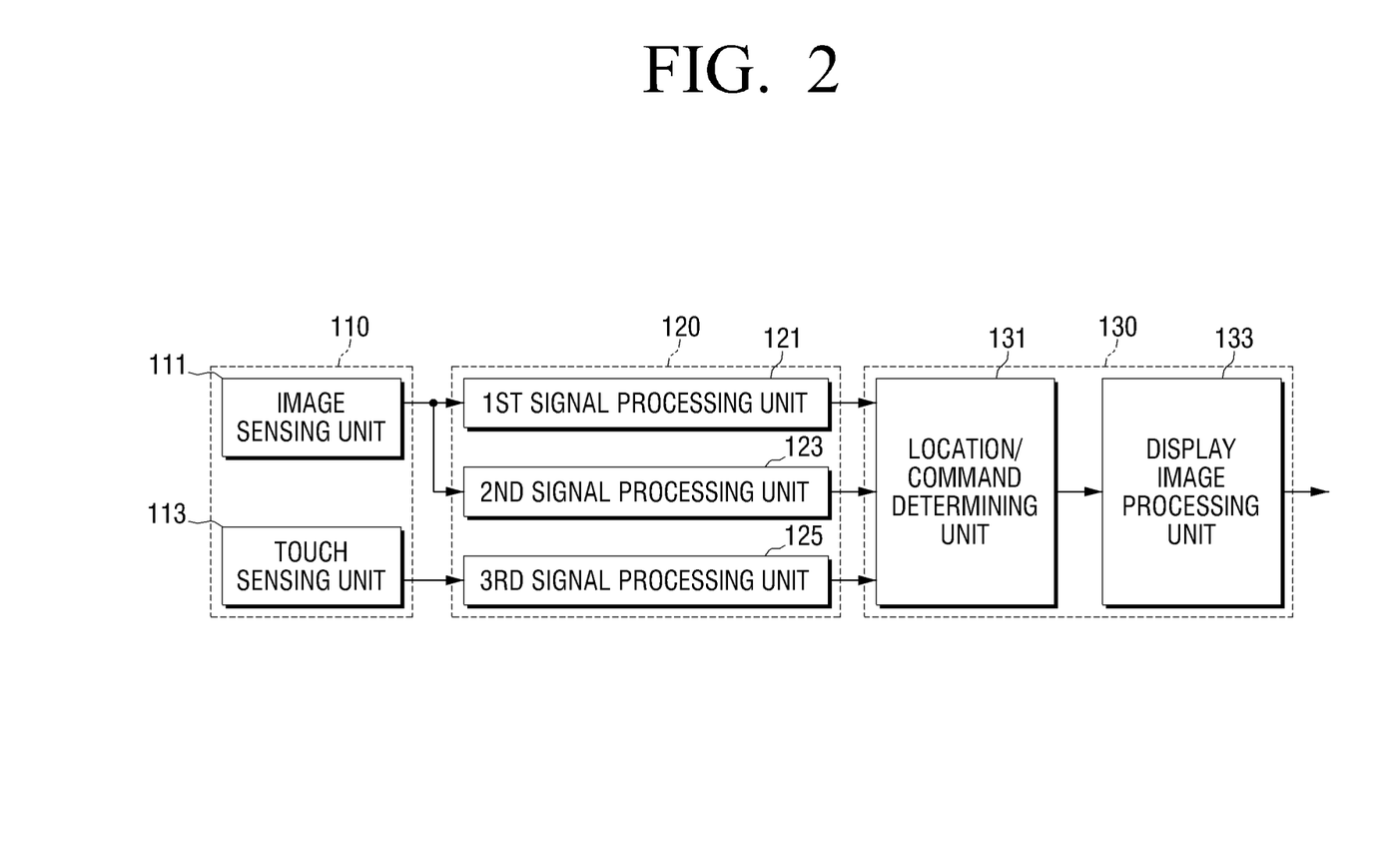
FIG. 2 is a view illustrating a detailed structure of a display apparatus according to an exemplary embodiment.

FIG. 2 is a view illustrating the detailed structure of the display apparatus 100 according to an exemplary embodiment. Components including content output unit 140, display 150, control unit 160, and storage unit 170 are skipped in FIG. 2 for purposes of brevity.

Sensing unit 110 includes an image sensing unit 111 and a touch sensing unit 113.

Image sensing unit 111 is placed on an upper end of display apparatus 100 to photograph images in front of display apparatus 100, and transmit an image signal related to the photographed image, to location recognizing unit 120.

Touch sensing unit 113 may be placed on a front side of display apparatus 100, to receive a user touch manipulation and transmit a touch signal corresponding to the touch input by the user, to location recognizing unit 120.

Location recognizing unit 120 includes a first signal processing unit 121, a second signal processing unit 123, and a third signal processing unit 125.

First signal processing unit 121 extracts user information related to the user location and area from the image signal received from image sensing unit 110, and analyzes the extracted information. Specifically, based on the image signal received from image sensing unit 110, first signal processing unit 121 computes coordinates of the user location based on display apparatus 100, and transmits the computed location coordinates to content processing unit 130.

Second signal processing unit 123 extracts user information related to the user motion from the image signal received from image sensing unit 110, and analyzes the extracted information. Specifically, based on the image signal received from image sensing unit 110, second signal processing unit 123 computes coordinates of the user's face and hands based on the front side of display apparatus 100, and transmits the computed coordinates to content processing unit 130.

Third signal processing unit 125 extracts user information related to the user's touch from the touch signal received from touch sensing unit 113, and analyzes the extracted information. Specifically, based on the touch signal received from touch sensing unit 113, third signal processing unit 125 computes touch coordinates of a touched location on display apparatus 100, and transmits the computed touch coordinates to content processing unit 130.

Content processing unit 130 includes an area and command determining unit 131, and a display image processing unit 133.

The area and command determining unit 131 receives from the first, second and third signal processing units 121, 123, 125: i) coordinates of user location relative to display apparatus 100; ii) coordinates of a user's face and hands based on the front side of the display apparatus 100; and iii) coordinates of a location where the user touches the screen of the display apparatus 100, and determines the user location or area, and user command.

Specifically, based on the user location coordinates received from first signal processing unit 121, area and command determining unit 131 determines the user location or area relative to display apparatus 100. Additionally, based on the coordinates of the user's face and hands received from second signal processing unit 123, area and command determining unit 131 determines the user manipulation command with respect to display apparatus 100. Additionally, based on the touch coordinates received from the third signal processing unit 125, the area and command determining unit 131 determines the user command corresponding to the touch coordinates.

The abovementioned operation will be explained in more detail below with reference to FIGS. 3 and 4.

Figure 3:
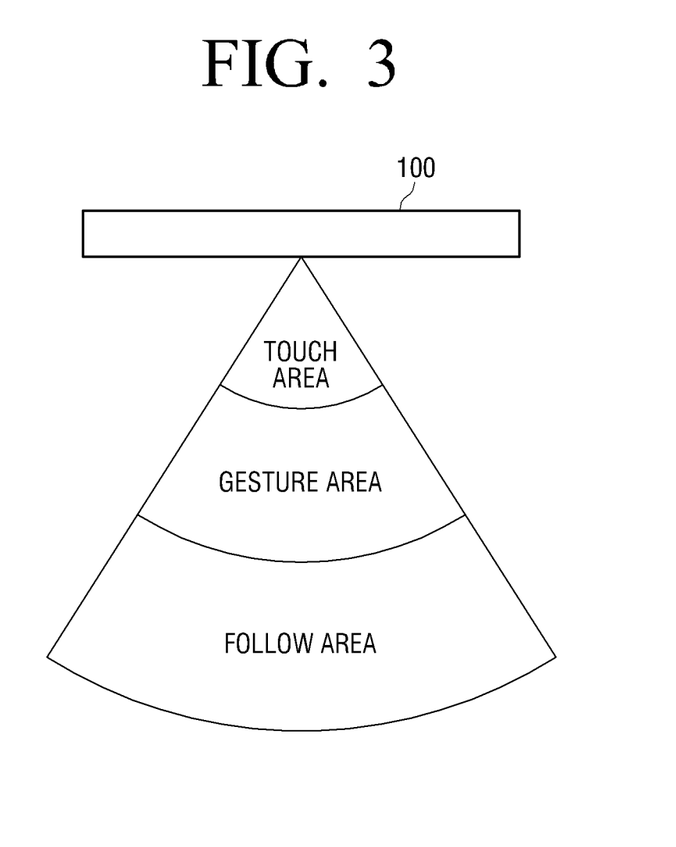
FIG. 3 is a view provided to explain a user area where a user is positioned.

FIG. 3 is provided to explain an area where the user is positioned. Specifically, FIG. 3 illustrates display apparatus 100 when viewed from above.

As illustrated in FIG. 3, the surrounding area of display apparatus 100, or more specifically, the front area of display apparatus 100 may be divided into a touch area, a gesture area, and a follow area.

The 'touch area' is where display apparatus 100 responds to the user touch manipulation. By way of example, when the user is in the touch area, display apparatus 100 configures and displays a screen corresponding to the touch area, selectively extracts the user information based on the coordinates of a location on display apparatus 100 where the user touches, and changes the current screen to a screen based on the touch coordinates, and displays the changed screen.

If the user is in the touch area, it is likely that the user is interested in display apparatus 100. Accordingly, based on the assumption that the user is interested, display apparatus 100 configures a menu screen for product purchase and provides the screen to the user.

The 'gesture area' is where display apparatus 100 responds to the user gesture manipulation. By way of example, when the user is in the gesture area, display apparatus 100 configures and displays a screen corresponding to the gesture area, selectively extracts the user information based on user motion, and changes the current screen to a screen corresponding to the user motion, and displays the changed screen.

When the user is in the gesture area, the user is likely to have a lesser, but certain degree of interest, or it is possible that his interest is increased. Accordingly, display apparatus 100 configures and displays an advertising screen, in a manner that the advertising screen changes in accordance with the user motion, to thereby raise the user's interest.

The 'follow area' is where display apparatus 100 responds to the movement of the user. By way of example, when the user is in the follow area, display apparatus 100 configures and displays a screen corresponding to the follow area, selectively extracts the user information based on the direction or location of the user movement, and changes the current screen to a screen corresponding to the direction or location of the user movement, and displays the changed screen.

If the user is in the follow area, it is likely that the user has a little or no interest in display apparatus 100. Accordingly, display apparatus 100 configures and displays an advertising screen, in a manner that the advertising screen follows in the direction of the user to draw the user's attention.

Figure 4:
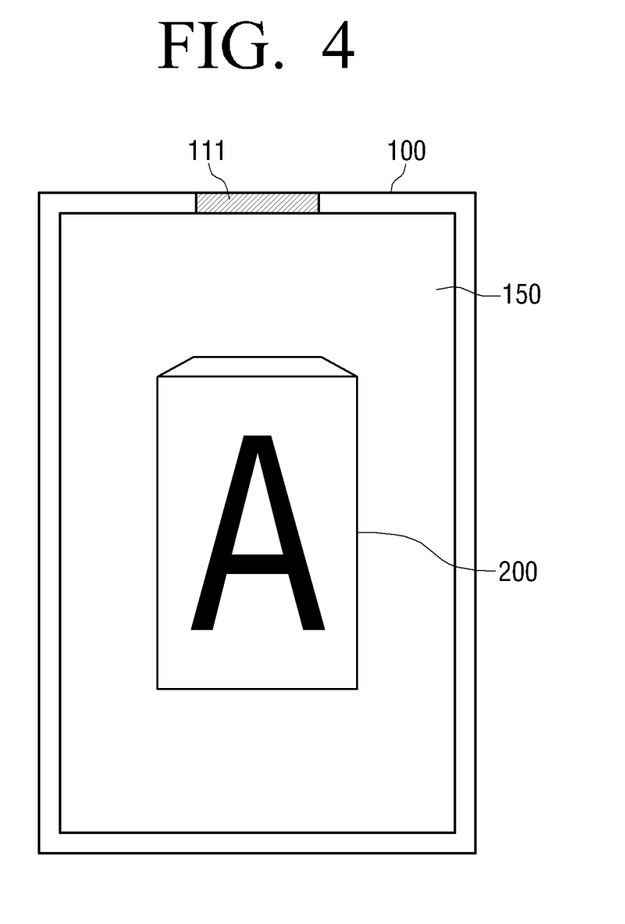
FIG. 4 is a view illustrating a front view of a display apparatus according to an exemplary embodiment.

FIG. 4 illustrates a front appearance of display apparatus 100 according to an exemplary embodiment.

As illustrated, display apparatus 100 includes image sensing unit 111 provided on the upper end to photograph images in front of the display apparatus 100.

Additionally, touch sensing unit 113 senses a touch input which is provided inside display 150 to support display 150 operating in a touch screen mode.

As explained above, display apparatus 100 configures and displays a screen in accordance with the user area. Accordingly, when the user is in the touch area, an item 200 displayed on the screen is for product purchase, while the item 200 displayed on the screen is for product advertising, when the user is in the gesture or follow area.

If the user is in the touch area, item 200 on the screen is changeable or selectable by user manipulation through touching, and when the user is in the gesture or follow area, the item 200 on the screen is changeable in accordance with user motion or the direction where the user moves.

Referring back to FIG. 2, as the screen is configured based on the user location or area, area and command determining unit 131 determines the user manipulation command based on the location, direction of movement, or touch or motion of the user.

Area and command determining unit 131 transmits to display image processing unit 133 the information regarding the user location or area, and information regarding the user manipulation command. Display image processing unit 133 configures a screen based on the user location or area, in a manner that the screen is changed and configured based on the user information which is selectively extracted in accordance with the user location or area.

Display image processing unit 133 transmits the configured or changed screen to content output unit 140.

Accordingly, a realistic interaction is possible between display apparatus 100 and the user, and the user is provided with contents in a more effective manner.

Operations Based on the User Locations

Hereinbelow, the detailed operations that are carried out based on the user location or area will be explained with reference to FIGS. 5 to 8.

Figure 5:
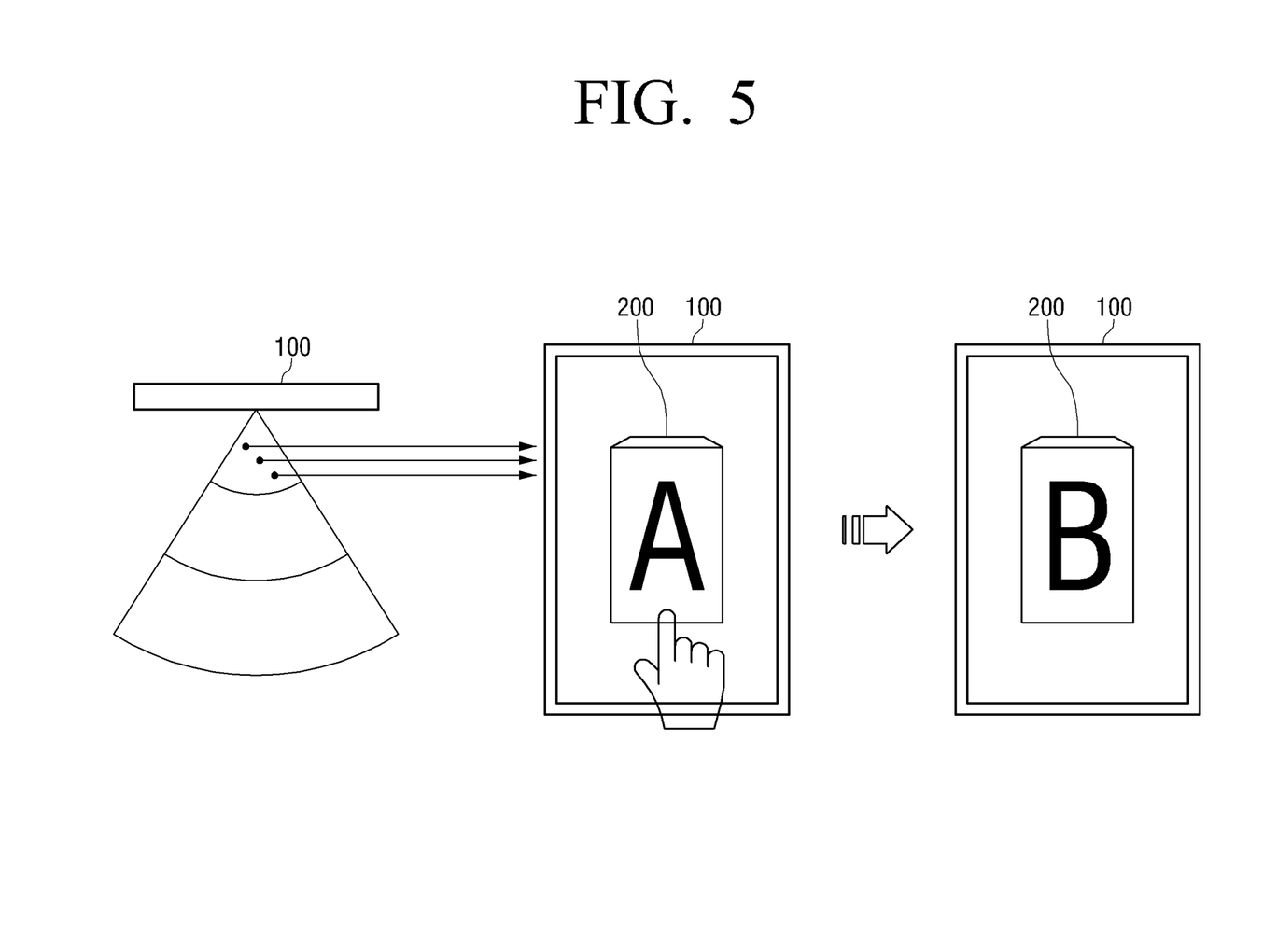
FIG. 5 is a view provided to explain motions within a touch area according to an exemplary embodiment.

FIG. 5 is a view provided to explain the operation in the touch area.

As illustrated, as long as the user is in the touch area, display apparatus 100 configures and displays the same menu screen, irrespective of whether the user is on the upper, lower, left or right side of the touch area. Since the user is relatively near display apparatus 100, it is meaningless to divide the user location to the upper, lower, left and right sides of the touch area, and configure different menu screens for each.

Meanwhile, display apparatus 100 provides a menu screen which is suitable for receiving a user's touch input. By way of example, display apparatus 100 may provide a menu screen on which items are provided in appropriate sizes (not to small), within convenient reach of the user's hand (instead of being presented at corners), or at locations where the user can easily touch by raising his right or left hand.

If the user is in the touch area, display apparatus 100 selectively extracts the user information based on the user's touch input, and operates according to the extracted user information. Accordingly, as illustrated, when the user touches an item 200, the item 200 is changed in accordance with the user's touch input.

Figure 6:
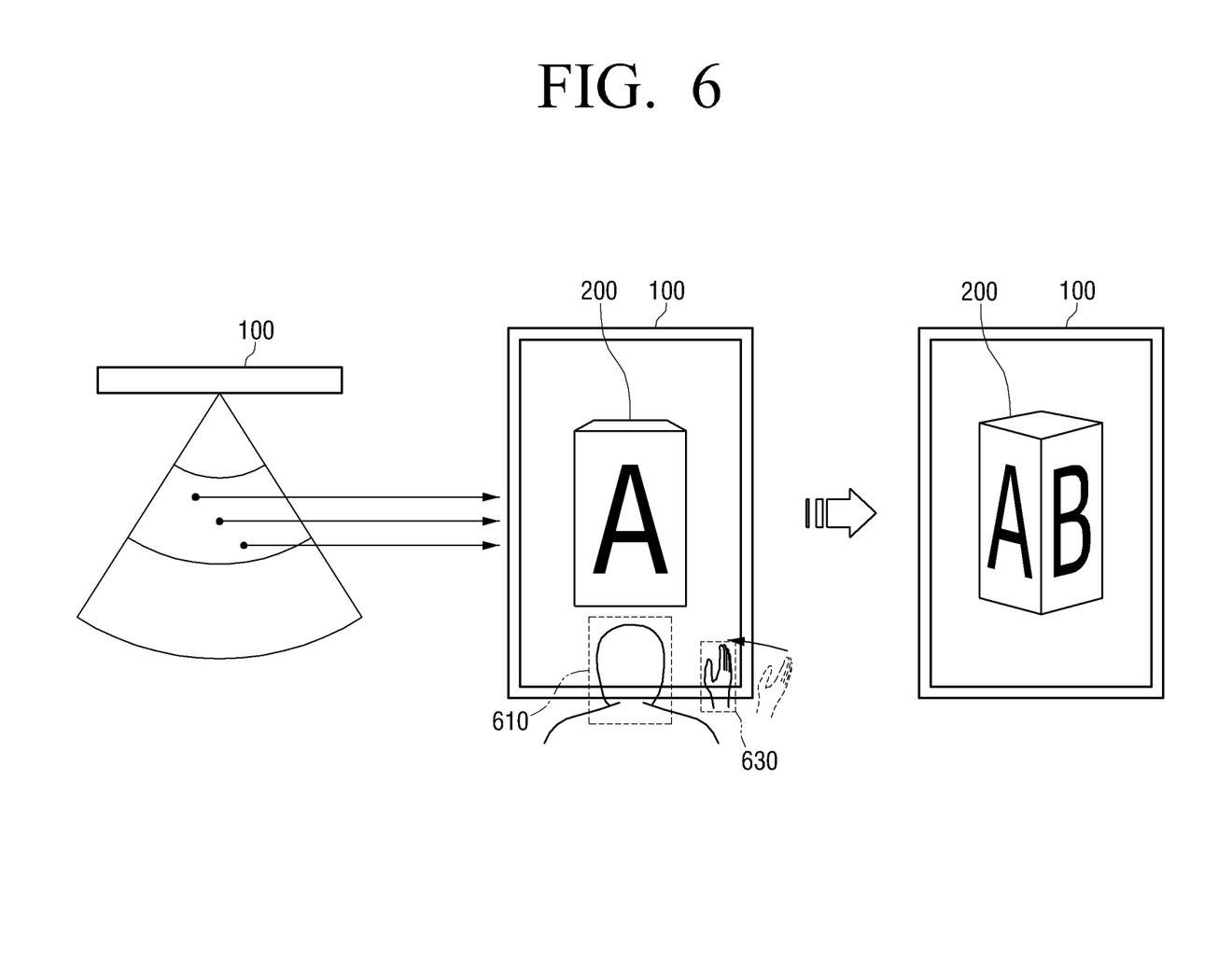
FIG. 6 is a view provided to explain motions within a gesture area according to an exemplary embodiment.

FIG. 6 is a view provided to explain the operations in the gesture area.

As illustrated, when the user is in the gesture area, display apparatus 100 configures and displays the same advertising screen, irrespective of whether the user is on the upper, lower, left, or right side of the gesture area. Again, since the user is relatively near to display apparatus 100, it is meaningless to divide the user location to the upper, lower, left and right sides of the gesture area, and configure different advertising screens for each.

Meanwhile, display apparatus 100 provides an appropriate advertising screen in response to user motions. That is, the advertising screen may contain content with which a user is tempted to make motions in order to operate display apparatus 100, without requiring separate instructions.

When the user is in the gesture area, display apparatus 100 selectively extracts the user information based on the user motions, and operates in accordance with the selectively extracted user information, that is, the user motions. Accordingly, when the user is standing in front of display apparatus 100, display apparatus 100 analyzes the locations of the user's head, eyes, hands, or the like, and when the analyzed locations change, extract the changes as the user command.

Referring particularly to FIG. 6, display apparatus 100 in this exemplary embodiment analyzes the locations of the user's head and one hand (indicated by dotted squares 610, 630).

Accordingly, display apparatus 100 may extract the user command based on the user's motion of changing his hand from right side to the left, and changes to a screen which corresponds to the user command by, for instance, rotating a polygonal item 200 from the right side to the left.

FIGS. 7A to 7D provide supplemental explanation of changes in the screen, in accordance with the motions made by the user. Referring to FIGS. 7A to 7D, when the user's face or hand is directed to a certain portion of the screen, display apparatus 100 causes the certain portion to be distinctively displayed rather than the rest portions displayed before motion occurs, or to replace the rest portions presented on the screen when motion is provided.

Figure 7A:
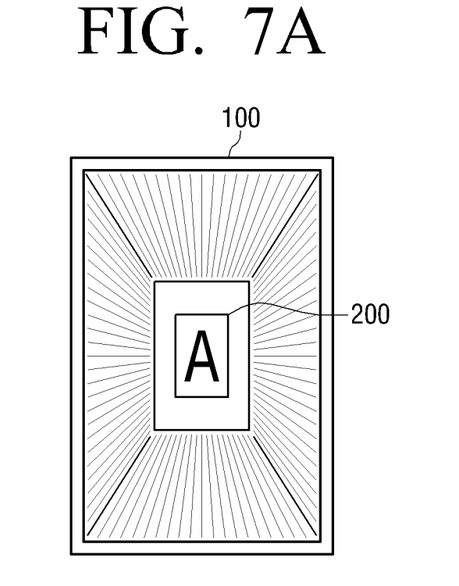
FIGS. 7A to 7D represent views provided for supplement explanation of screen changes, in accordance with the motions made.

Specifically, FIG. 7A is a view illustrating a screen which is changed and displayed as the user moves his hand to the direction of display apparatus 100. In this case, display apparatus 100 assumes that too large screen is provided to the user, and thus contracts the items 200 on screen and provides items 200 in smaller sizes.

Figure 7B:
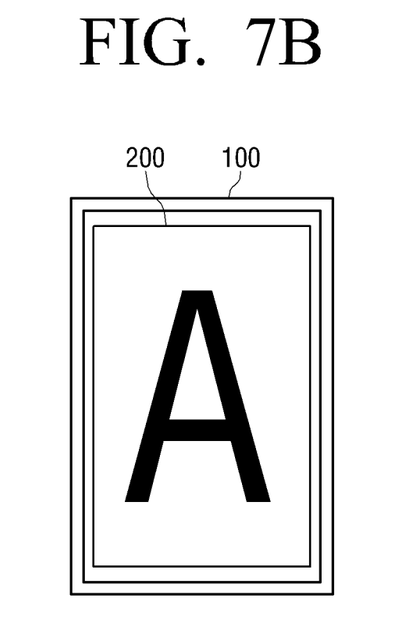

FIG. 7B is a view illustrating a screen which is changed and displayed as the user moves his hand toward himself. In this case, display apparatus 100 assumes that too small a screen is provided to the user, and thus expands the items 200 on the screen and provides items 200 in larger sizes.

Figure 7C:
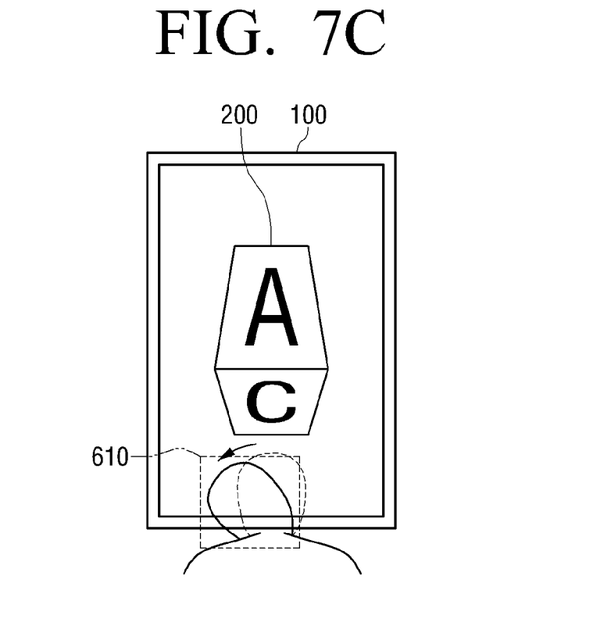

FIG. 7C is a view illustrating a screen which is changed and displayed as the user bends his head down. In this case, display apparatus 100 assumes that the user wants to check the lower portion of the items 200, and thus rotates the items 200 on screen so that the lower portion is displayed.

In this situation, display apparatus 100 is checking the location of the user's head, as indicated by the dotted square 610.

Figure 7D:
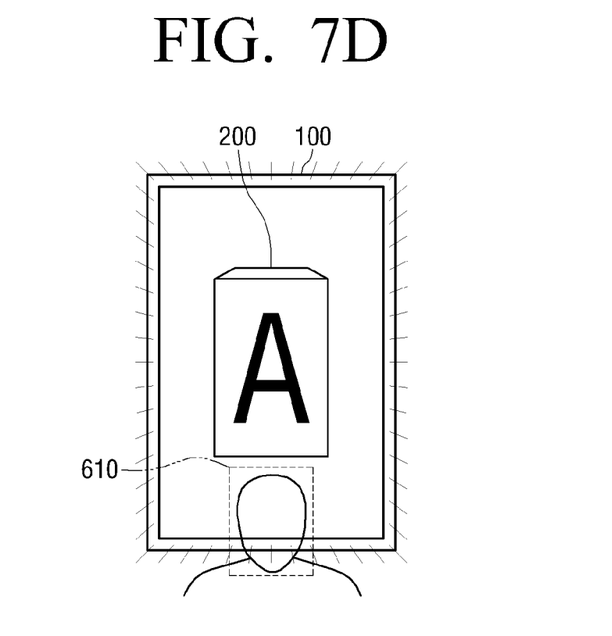

FIG. 7D is a view illustrating a screen which is changed and displayed as the user turns his back to the screen. In this situation, display apparatus 100 highlights the screen itself, or items 200 on screen, to draw the user's attention to the screen.

Figure 8:
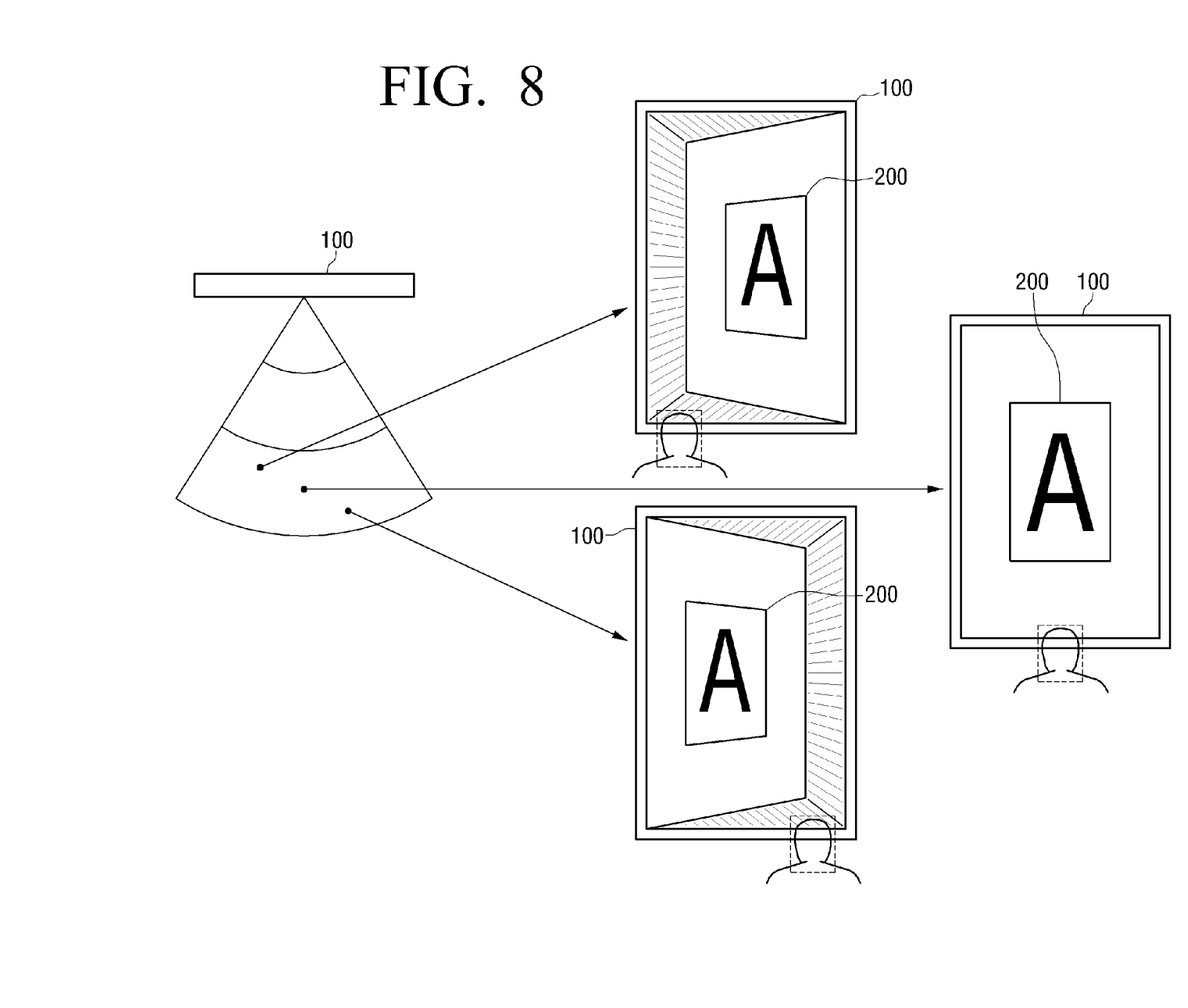
FIG. 8 is a view providing an explanation of motions in an area, according to an exemplary embodiment.
Figure 9:
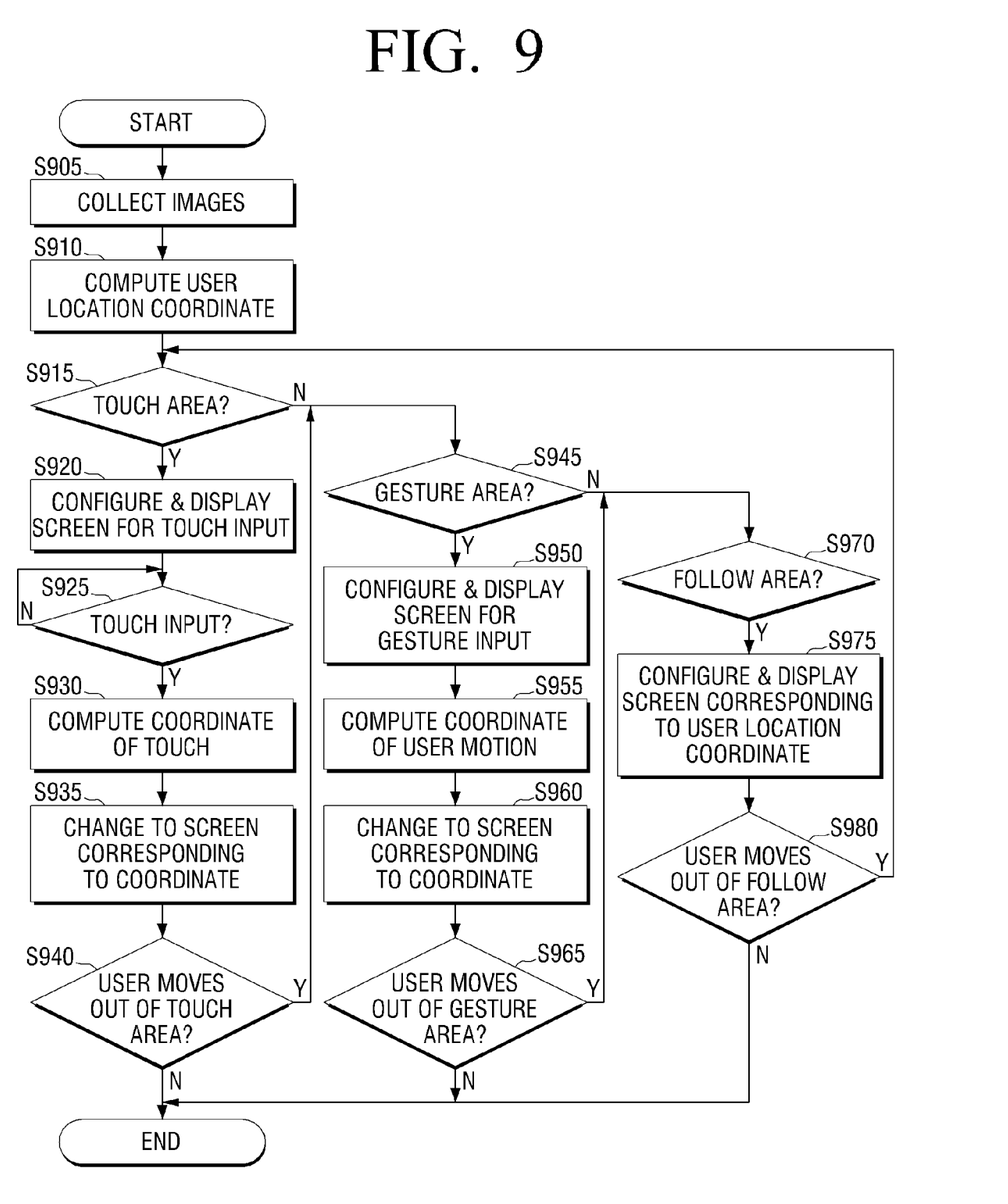
FIG. 9 is a flow chart provided for explanation of a display method, according to an exemplary embodiment.

FIG. 8 is a view provided to explain the operations carried out in the follow area.

If the user is in the follow area, display apparatus 100 may configure a different advertising screen depending on the location where the user is positioned, and displays the configured screen. By doing so, display apparatus 100 ensures that the user interest is excited, to induce the user to watch the advertising screen, even when the user is relatively far away from the display apparatus 100 and does not perceive the advertising screen quite well.

By way of example, when the user is on the left side of display apparatus 100, as illustrated, display apparatus 100 may configure a screen to have an effect that the screen is displayed to the left direction where the user is positioned, and displays the screen.

Additionally, when the user is in the follow area, display apparatus 100 selectively extracts the user command based on the direction of the user movement, and operates according to the selectively-extracted user information, that is, according to the direction of user movement.

Accordingly, when the user moves from the left side to the center of the display apparatus 100, as illustrated, display apparatus 100 changes the screen so that the screen is displayed to the center. When the user continues moving from the center to the right side of display apparatus 100, as illustrated, display apparatus 100 changes the screen so that the screen is displayed to the right side.

As a result, a realistic interaction is possible between display apparatus 100 and the user, and the user is provided with contents in a more effective way.

Operation Flowchart of the Screen Configuration

The operation flowchart of configuring a screen based on user information will be explained below, with reference to FIG. 9, which is a flowchart provided to explain a display method according to an exemplary embodiment.

At S905, display apparatus 100 collects images, and at S910, computes coordinates of the user location based on the collected images.

At S915-Y, when determining that the user is in the touch area based on the computed coordinates, at S920, the display apparatus 100 configures a screen for touch input and displays the screen.

At S925-Y, when the user touch is input, at S930, display apparatus 100 computes coordinates of a location where the touch is input, and at S935, changes the current screen to a screen which corresponds to the coordinates of the location where the touch is input.

At S940, display apparatus 100 determines whether or not the user moves out of the touch area, at S940-Y, when determining so, determines at S945 when the user is in the gesture area, or determines at S970 when the user is in the follow area.

Meanwhile, at S945-Y, when determining that the user is in the gesture area based on the computed coordinates, at S950, display apparatus 100 configures a screen for gesture input and displays the screen.

Additionally, at S955, display apparatus 100 computes coordinates regarding a user's motion, and at S960, changes to a screen which corresponds to the coordinates of the motion made by the user's hand, head, or the like.

At S965, display apparatus 100 determines when the user moves out of the gesture area, and at S965-Y, when determining so, at S970, determines whether the user is in the follow area.

Meanwhile, at S970-Y, when determining that the user is in the follow area based on the computed coordinates, at 5975, display apparatus 100 configures a screen which corresponds to the coordinates of the direction where the user moves, and displays the screen.

At S980, display apparatus 100 determines when the user moves out of the follow area, and at S980-Y, when determining so, at S915, determines when the user is in the touch area.

As a result, a realistic interaction is possible between display apparatus 100 and the user, and the user is provided with contents in a more effective way.

Other Embodiments

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

Specifically, the screen configurations or manner of changing the screen explained above are only examples used for the sake of convenient explanation. Therefore, different screen configurations, or different manner of screen changes are equally applicable according to an aspect of the exemplary embodiments.

Furthermore, although three user areas are particularly exemplified and explained in the description provided above, these should not be understood as limiting. Accordingly, the user area may be divided into more than three areas, and display apparatus 100 may operate in a manner different from those explained above with respect to the three user areas.

Furthermore, although it is explained that a menu screen or an advertising screen is configured and displayed, this also should not be understood as limiting, since the content of the screen can be configured in a different manner.

Furthermore, although it is explained that different user information is extracted depending on the user area, this also should not be understood as limiting. The same user information may also be extracted for different user areas. By way of example, with respect to the touch area, the user motion and direction of user movement information may be extracted along with the coordinates of the location where the user touch is input, while with respect to the gesture area, not only the user motion information, but also the information about the direction of user movement can be extracted.

Furthermore, although the user areas are divided based on a distance from the display apparatus 100, a different reference may be equally applied to divide the user areas.

As a result, it is possible to provide a realistic interaction between display apparatus 100 and the user, provide the user with specialized service, and thus excite the user's interest and excitement about the content provided to the user.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
a display which displays contents;
a location recognizing unit which detects distance between the display apparatus and a user; and
a control unit which controls the display to determine an area where the user is positioned, based on distance between the display apparatus and the user which is detected through the location recognizing unit; controls the display to display advertising contents to follow the user, when the user is positioned in a first area; controls the display to display advertising contents according to a motion of the user, when the user is positioned in a second area; and controls the display to display a screen for purchase of a product which corresponds to the advertising contents, when the user is positioned in a third area,
wherein all points within the third area are closer to a predetermined point on the display apparatus than any point within the second area, such that when the user is positioned closer to the predetermined point than any point within the second area, the control unit controls the display based on the user being positioned in the third area, and wherein all points within the second area are closer to the predetermined point on the display apparatus than any point within the first area, such that when the user is positioned closer to the predetermined point than any point within the first area and further from the predetermined point than any point within the third area, the control unit controls the display based on the user being positioned in the second area,
and wherein each point that is within a field of view of the display apparatus is included in one of the first area, the second area, and the third area.

2. The display apparatus of claim 1, wherein the control unit controls the display to extract information with respect to a moving direction of the user when the user is positioned in the first area, change a display direction of the advertising contents based on the extracted information with respect to the moving direction, and display the advertising contents.

3. The display apparatus of claim 1, wherein the control unit controls the display to change the advertising contents to correspond to the user motion and display the advertising contents, when the user is located in the second area.

4. The display apparatus of claim 3, wherein the user motion comprises at least one of a face motion and a hand motion of the user.

5. The display apparatus of claim 4, wherein the control unit controls the display to cause the screen to be changed to distinguish a certain portion of the screen from a rest area, when a face or hand of the user is directed to the certain portion of the screen.

6. The display apparatus of claim 1, wherein the advertising contents include at least one content which is operable by a user touch, when the user is positioned in the third area.

7. The display apparatus of claim 6, wherein the control unit controls the display to change to a screen which is related to touched contents from among the at least one content based on coordinate information of the touched position, and to display the screen.

8. The display apparatus of claim 1, wherein the control unit controls the display to set a command with respect to the display apparatus for each respective area where the user is positioned, ignore an input command when the input command is non-compliant with the command which is set for the respective area where the user is positioned, and display a screen for product purchase of the advertising contents or the products corresponding to the contents, when the input command which is compliant to the set command is received, based on the input command.

9. A display method, comprising:
detecting a distance between a display apparatus and a user;

determining an area where the user is positioned, based on the detected distance between the display apparatus and the user; and displaying advertising contents to follow the user, when the user is positioned in a first area, displaying advertising contents according to a motion of the user, when the user is positioned in a second area, and displaying a screen for purchase of a product which corresponds to the advertising contents, when the user is positioned in a third area, wherein all points within the third area are closer to a predetermined point on the display apparatus than any point within the second area, such that when the user is positioned closer to the predetermined point than any point within the second area, the control unit controls the display based on the user being positioned in the third area, and wherein all points within the second area are closer to the predetermined point on the display apparatus than any point within the first area, such that when the user is positioned closer to the predetermined point than any point within the first area and further from the predetermined point than any point within the third area, the control unit controls the display based on the user being positioned in the second area and wherein each point that is within a field of view of the display apparatus is included in one of the first area, the second area, and the third area.

10. The display method of claim 9, wherein the displaying comprises extracting information with respect to a moving direction of the user when the user is positioned in the first area, changing a display direction of the advertising contents based on the extracted information with respect to the moving direction, and displaying the advertising contents.

11. The display method of claim 9, wherein the displaying comprises
changing the advertising contents to correspond to the user motion and displaying the advertising contents, when the user is located in the second area.

12. The display method of claim 11, wherein the user motion comprises at least one of a face motion and a hand motion of the user.

13. The display method of claim 12, wherein the displaying comprises causing the screen to be changed to distinguish a certain portion of the screen from a rest area, when a face or hand of the user is directed to the certain portion of the screen.

14. The display method of claim 9, wherein the advertising contents include at least one content which is operable by a user touch, when the user is positioned in the third area.

15. The display method of claim 14, wherein the displaying comprises changing to a screen which is related to touched contents from among the at least one content based on coordinate information of the touched position and displaying the screen.

16. The display method of claim 9, further comprising:
setting a command with respect to the display apparatus for each respective area where the user is positioned,
wherein the displaying comprises ignoring an input command when the input command is non-compliant with the command which is set for the respective area where the user is positioned, and displaying a screen for product purchase of the advertising contents or the products corresponding to the contents, when the input command which is compliant with the set command is received, based on the input command.

* * * * *